INVENTOR.
WALTER H. HOGAN
BY
ATTORNEY

INVENTOR.
WALTER H. HOGAN
BY
ATTORNEY

April 15, 1958   W. H. HOGAN   2,830,562
HYDRAULIC BALL SCREW TYPE STEERING MOTOR AND SHIMMY DAMPER
Filed Jan. 21, 1954   5 Sheets-Sheet 3

INVENTOR.
WALTER H. HOGAN
BY
ATTORNEY

April 15, 1958  W. H. HOGAN  2,830,562
HYDRAULIC BALL SCREW TYPE STEERING MOTOR AND SHIMMY DAMPER
Filed Jan. 21, 1954  5 Sheets-Sheet 5

INVENTOR.
WALTER H. HOGAN
BY
ATTORNEY

United States Patent Office 2,830,562
Patented Apr. 15, 1958

2,830,562

HYDRAULIC BALL SCREW TYPE STEERING MOTOR AND SHIMMY DAMPER

Walter H. Hogan, Olmsted Falls, Ohio, assignor to The Cleveland Pneumatic Tool Company, Cleveland, Ohio, a corporation of Ohio Application January 21, 1954, Serial No. 405,310

12 Claims. (Cl. 121—41)

This invention relates broadly to aircraft, but more particularly to an improved fluid actuated steering and shimmy controlling device for airplane landing wheels.

One object of this invention is to produce a steering and shimmy controlling device comprising mainly a cylinder and a piston axially movable therein, thereby overcoming the packing difficulties heretofore encountered with similar devices of the oscillatory piston type.

Another object of this invention is to produce a shimmy controlling device wherein the shimmy or oscillatory motions of the landing wheel are translated into reciprocatory motion of a piston within a cylinder, and checked by restricted flow of hydraulic fluid from one side of the piston to the other.

Another object of this invention is to produce a steering device wherein reciprocatory motion of the piston within its cylinder, effected by controlled admission and exhaust of pressure fluid into and from the cylinder, is translated into the rotary or steering motion of the landing wheel.

Another object of this invention is to provide simple and efficient valve means through which a hydraulic wheel shimmy damper can be efficiently used as a steering motor of relatively simple construction, which is positive in operation and of general superiority and serviceability.

Another object of this invention is to equip a steering device with a self-centering mechanism adapted to automatically return the wheel to a pre-determined or neutral position when the supply of the actuating fluid has been shut off.

Another object of this invention is to provide an improved hydraulically operated steering and shimmy controlling device with simple and efficient means for automatically replenishing hydraulic fluid which might have escaped therefrom, thereby assuring safe and efficient operation of the device.

Another object of this invention is to provide such hydraulically operated steering and shimmy controlling device with efficient means for preventing excessive pressure from developing within the device as a result of fluid expansion caused by a pronounced temperature increase.

Other objects of this invention will be apparent from the following detailed description, wherein similar characters of reference designate corresponding parts, and wherein.

Figure 1:
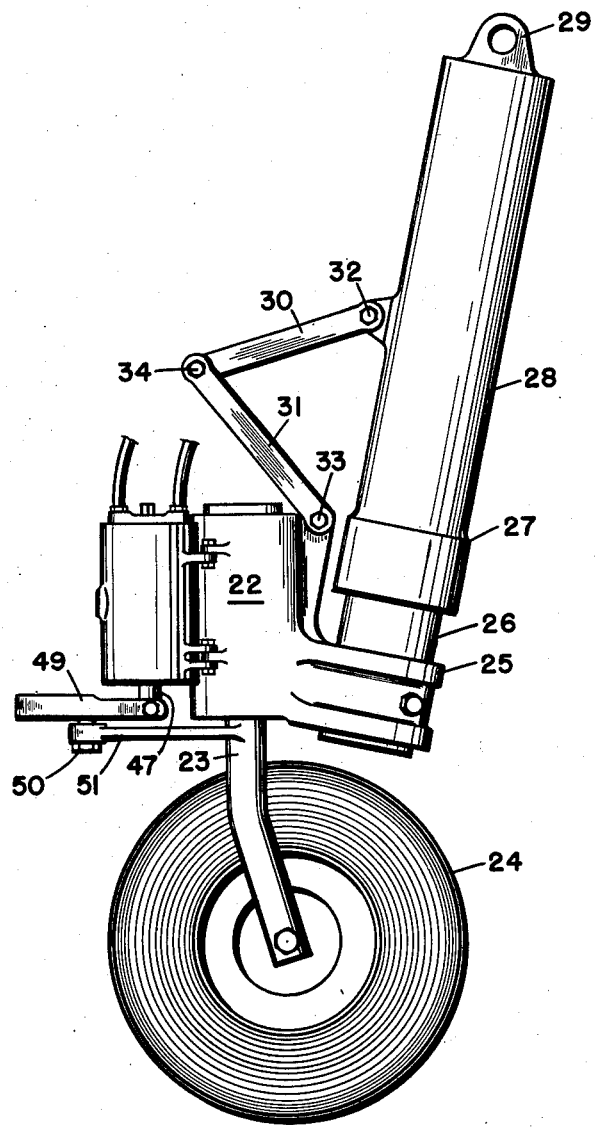
Figure 1 is a side elevational view of a nose wheel landing gear embodying the invention.
Figure 3:
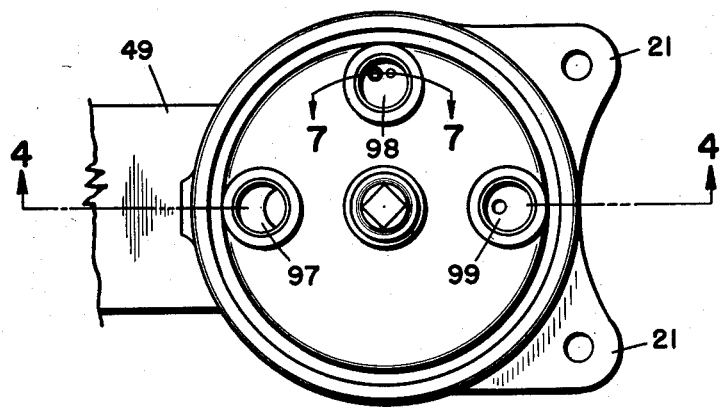
Figure 3 is a top plan view looking in the direction of the arrows 3—3 in Figure 2.
Figure 2:
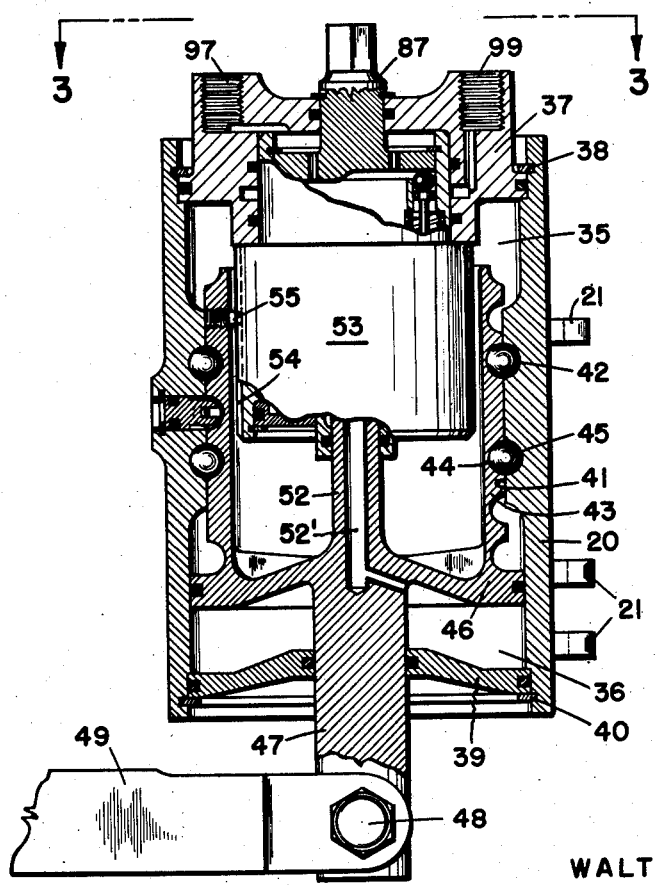
Figure 2 is an enlarged longitudinal sectional view of the steering and shimmy controlling unit shown in Figure 1.

Referring to the drawings, 20 represents a cylindrical housing having laterally extending lugs 21 through which the housing may be secured to an axle housing 22, shown in Figure 1, within which is journaled the upper end of a yoke 23 having operatively mounted on the lower end thereof a landing wheel 24. Preferably, axle housing 22 is affixed as at 25 to the upper cylinder 28 which is generally affixed to an airplane by a terminal such as 29. Relative rotation between cylinder 28 and axle housing 22 is prevented by the usual torque arms 30 and 31, the former pivotly connected to cylinder 28 by a cross pin 32 and the latter to the axle housing 22 by a cross pin 33, the inner ends of the cross arms being pivotly connected to each other by a cross pin 34.

The unit about to be described is used primarily in conjunction with the nose landing wheel of an airplane and as shown in Figure 1, the unit is operatively connected with the wheel carrying yoke 23 through a linkage about to be described.

Cylinder housing 20 has upper and lower cylindrical chambers 35 and 36, respectively, the chamber 35 being closed by a cap 37 retained in position by a spring clip 38, while the lower chamber 36 is closed by a disc-like bearing plate 39 retained in position by a spring clip 40. Between the two chambers 35 and 36, cylinder housing 20 is of a reduced diameter and has its inner wall 41 provided with a helical groove 42 of semi-circular cross-section, and of a lead calculated to produce the desired result. A piston 43 is closely fitted within the cylinder 20 and has its peripheral wall also provided with a helical groove 44 corresponding to the groove 42 and forming therewith a helical channel of circular cross section partly the piston 43 relative to the stationary cylinder 20 effects the axial movement of the piston.

In the usual ball screw and nut, it is necessary to provide a complete circuit for the balls. To that end the nut is preferably provided with a return tube which carries the ball from one end of the nut groove to the other. However, in construction where relatively short travel is required, such as the travel of piston 43 relative to the cylinder 20, the travel of the balls 45 is also small and a complete circuit of the balls is not needed. In such case, any suitable means, not shown, may be used to retain the balls within the helical channel.

The lower end of piston 43 has a flange 46 in fluid-tight engagement with the inner wall of chamber 36, and has a piston stem 47 depending therefrom centrally through the bearing plate 39. The free end of stem 47 is pivotally connected by a cross bolt 48 to a link 49 which extends radially therefrom and is provided with an elongated slot, not shown, within which is slidably guided a post 50 rigidly connected to the free end of a lever 51 extending radially as an integral part of the yoke 23. Piston 43 is cup shaped with a central stem 52 extending upwardly from the bottom thereof. Within the piston 43, there is a cylindrical valve housing 53 provided on the external wall thereof with two or more longitudinally extending keyways 54, each having fitted therein one end of a key 55 fixed to and carried by piston 43, thereby providing rotation transmitting means between the piston and the valve housing 53 while enabling relative axial movement therebetween.

Figure 6:
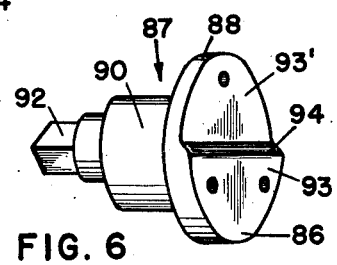
Figure 6 is a view in perspective of the steering member.
Figure 10:
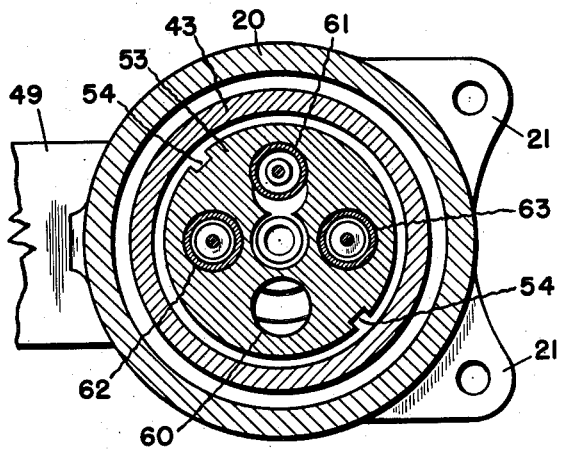
Figure 10 is a reduced cross section taken on line 10—10 in Figure 4.

A central cylindrical recess 56 provided in the valve housing 53 has the stem 52 extending therein in slidable guided engagement with the lower end thereof as at 57. Valve housing 53 has a reduced upper end 58 journaled within the cap 37 and sealed therein by packings 58'. As shown in Figure 10, valve housing 53 is provided with four equally spaced longitudinally extending bores 60, 61, 62 and 63, the bores 62 and 63 being diametrically opposed to each other as clearly shown in Figure 4 and each having mounted therein a valve mechanism including slidable sleeve 64, which for purpose of assembly is preferably made of three sections, now shown. This sleeve is formed with longitudinally spaced annular valve seats 59, 65 and 66 adapted to receive heads 67 and 68, respectively, of a valve 69 slidable therein and urged upwardly by a compression spring 70 having one end seated against head 68 and the other end against the bottom of an annular recess 71 formed in an annular plate 72 retained with the bottom of valve housing 53 by a spring clip 73. Between valve seats 65 and 66, sleeve 64 is provided with a pocket 74 opening on the valve seat 66 and capable of communication with the interior of piston 43 through a sleeve port 75 and a piston port 76. Valve seat 65 is also capable of communication with the cylindrical recess 56 through one or more sleeve ports 77 and valve housing port 78, and also with the interior or chamber 79 of the valve housing 53 through an orifice 19. Sleeve 64 is generally urged downwardly as viewed in Figure 4 by a compression spring 80 acting on the upper end of the sleeve and seated against an internal annular land 81 in the upper portion 58 of the valve housing 53. Valve 69 has a relatively long central stem 82 extending upwardly from head 67 and having a cylindrical terminal 83 slidably guided between the inner wall of valve housing portion 58 and a ring 84. On terminal 83 rests a ball 85 engaged by the lower end wall 86 of a valve actuator or steering member 87 which is formed with an annular flange 88 fitted within the upper portion 58 of valve housing 53 and retained therein by a spring clip 89. A central shank 90 extending upwardly from flange 88 is journaled within the cap 37 and made fluid tight therein by a packing 91. This shank has its free end portion 92 of polygonal cross section and is adapted to be connected to any suitable means operable by the airplane pilot. The lower end wall 86 of actuator 87 is cam shaped as shown in Figure 6, that is, it has two half end walls 93 and 93' at different levels and united by a cam or inclined wall 94.

The construction incorporated in the bore 63 is identical to the one within the bore 62 except that the pocket 74' is capable of communication with cylindrical recess 56 through valve housing port 93 and sleeve port 94, and the valve seat 65' is capable of connection with the interior of piston 43 through valve housing port 95 and sleeve port 96.

Figure 5:
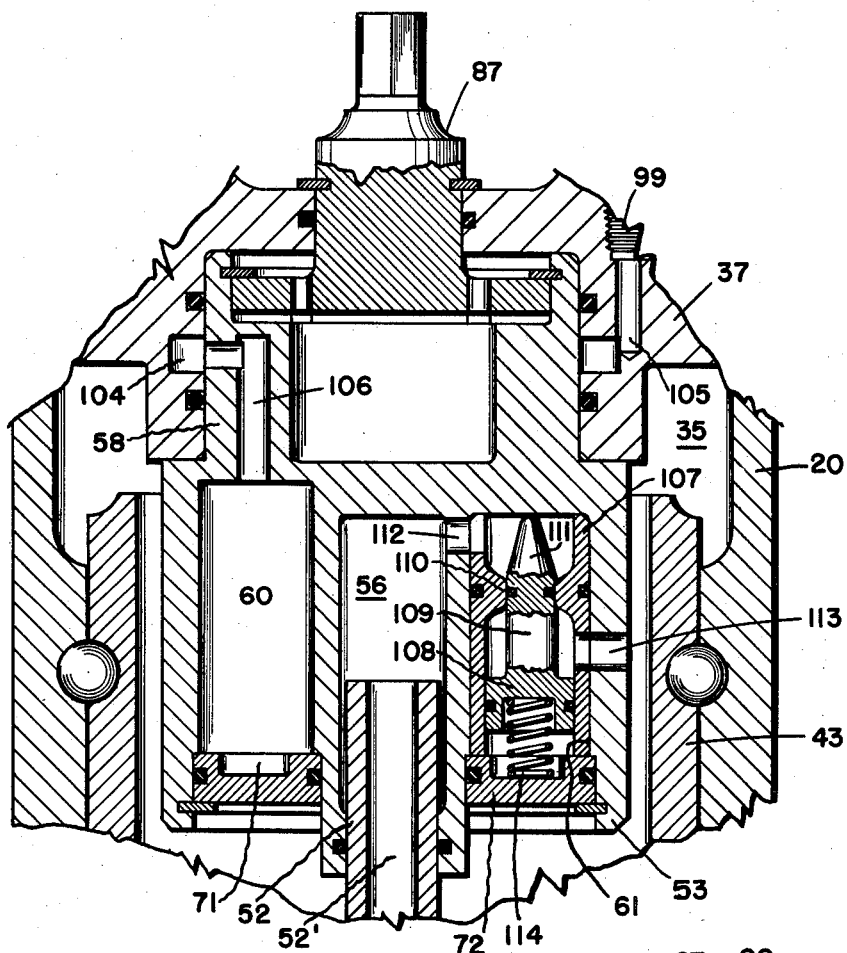
Figure 5 is a longitudinal sectional view taken on line 5—5 in Figure 4.

In the cap 37 are three screw threaded connections 97, 98 and 99. Connection 97 opens into an annular recess 100, through a channel 101, and therefrom into the valve block central chamber 79 through one or more ports 103. Connection 99 opens into an annular chamber 104 through a port 105, and therefrom into the bore 60 as shown in Figure 5 through port 106.

Fixed within the bore 61, there is a bushing 107 in which is slidably mounted a piston 108 formed with a stem 109 slidable through an orifice 110, and having its free end tapered as at 111. Above the orifice 110, bushing 107 is connected to the central cylindrical recess 56 through a port 112 and below the orifice 110 with the interior of piston 43 through a port 113. Piston 108 is normally urged upwardly to close the orifice 110 as shown in Figure 5 by a compression spring 114 having one end fitted within the piston 108 and the other end resting against the bottom of the annular recess 71.

Connection 98 leads into the upper chamber 35 of the cylinder 20 through two ports 115 and 116, the first port being normally closed by a spring pressed check valve 117 facing the chamber 35 into second port by a spring pressed check valve 118 facing connection 98.

Figure 8:
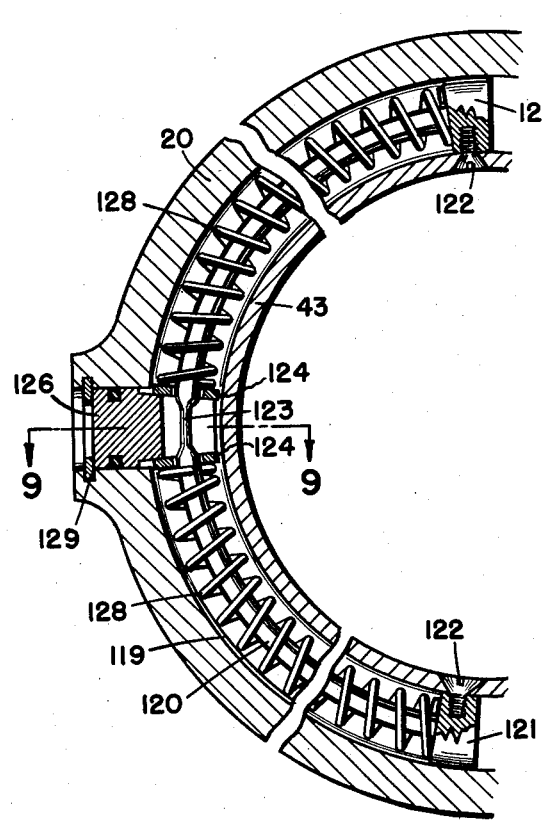
Figure 8 is a cross-sectional view taken on line 8—8 in Figure 4.
Figure 9:
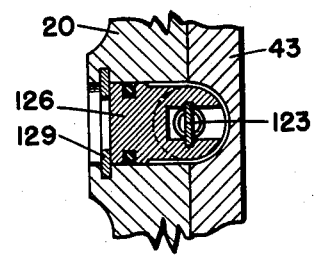
Figure 9 is a longitudinal sectional view taken on line 9—9 in Figure 8.

Shown in Figures 8 and 9 is a self-centering device including a helical channel 119 of circular cross section with one half cut within the inner wall of cylinder 20 and its other half within the external wall of piston 43. This channel is located parallel to the helical channel accommodating the balls 45. Fixed therein within an arc of substantially 180 degrees, there is a rod 120 terminating by enlarged heads 121 fixed to the piston 43 by set screws 122. This rod extends through a plug 126 fixed within the wall of cylinder 20 by a split ring 129 and protruding into the helical channel 119. Within this plug, rod 120 is formed with a central flat portion or stop 123 against each end of which rests a washer 124 which are also engaging the adjacent side walls of plug 126. Two compression springs 128 are mounted on the rod 120, one on each side of the plug 126 between head 121 and washer 124.

Figure 12:
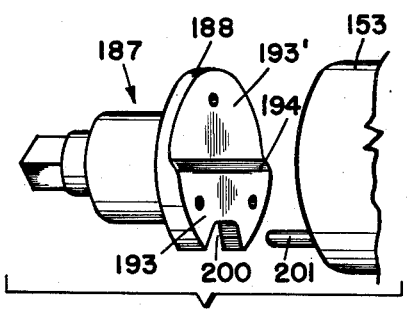
Figure 12 is a perspective view illustrating a modified construction of the steering member shown in Figure 6.

In the modified construction shown in Figure 12, the steering member 187 has its flange 188 adapted to be fitted within the upper portion 58 of the valve housing 53 in the same manner as the steering member 87 shown in Figure 6. In addition to the high and low lands 193 and 193' united by a cam or inclined face 194, it has its low land provided with a relatively wide slot 200 in which is located a pin 201 extending longitudinally from the adjacent end of a valve housing 153, which otherwise is a replica of valve housing 53.

Figure 11:
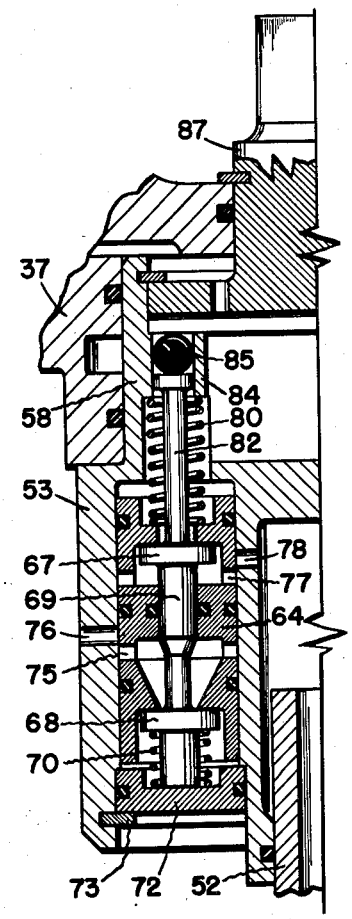
Figure 11 is a view showing the left hand valve in Figure 4 in a different position.

In the operation of the device, it will be understood that rotary or oscillatory motion of the nose wheel 24 on the axis of the yoke 23 within housing 22 is transmitted to the piston 43 through the linkage 49, 50 and 51, and that rotation of the piston 43 is similarly transmitted to the wheel 24. It will also be understood that the connections 97 and 99 represent the ends of conduits leading from the hydraulic system of the airplane, through which the entire device is first filled with hydraulic fluid such as oil. These conduits may be opened or closed relative to the connections 97 and 99 by adequate valve means operated by the airplane pilot. When the conduits are closed, the liquid within the unit is not pressurized, thereby allowing sleeves 64 to be shifted downwardly, as viewed in Figure 11, by the springs 80, to cause the left hand sleeve to have its ports 77 and 75 moved out of registry with the ports 78 and 76, respectively, and the right hand sleeve to have its ports 94 and 96 moved out of registry with the ports 93 and 95, respectively. In such instance, the unit is completely closed from the connections 97 and 99, irrespective of the position of steering member 87, and converted exclusively to shimmy damping.

The operation of the shimmy damper is as follows:
Oscillatory or shimmy motion of wheel 24 on the axis of the yoke 23 is transmitted to piston 43, by virtue of the balls 45 within the helical channel 42—44, translated into its axial or reciprocatory motion within cylinder 20, which motion is checked by displacement of the liquid from one to the other side of the piston. As shown in Figure 5, piston 108 and its stem 109 constitute a check valve for controlling the flow of the liquid between the cylinder chambers 35 and 36 through the system of ports and passages comprising port 113, orifice 110, port 112, chamber 56 and piston stem port 52'. The controlling orifice 110 is normally closed by the piston stem 109 by spring 114 maintaining tapered end 111 of the stem against the bottom of bore 61. As the liquid is displaced, for instance, from chamber 35, it enters sleeve 107 through port 113 to act on piston 108 for at least partly overcoming spring 114 and also partially opening the orifice 110. If the liquid is displaced from the chamber 36, it enters cylindrical recess 56 through piston stem port 52′, and therefrom flows into upper end of sleeve 107 through port 112 to act on the upper end 111 of piston 108 for at least partly overcoming spring 114 and partially opening the orifice 110. From the foregoing, it will be understood that the check valve or piston stem 109 is responsive to an increase of pressure within either chambers 35 or 36 for opening orifice 110, which pressure is proportionate to the shimmy force or side load to which the wheel 24 is subjected. The spring 114 is calculated to prevent opening of the orifice 110 upon small pressure variation within chambers 35 and 36, thereby entirely preventing small oscillatory vibrations to which the wheel might be subjected, while checking or damping similar but more pronounced vibrations.

Figure 4:
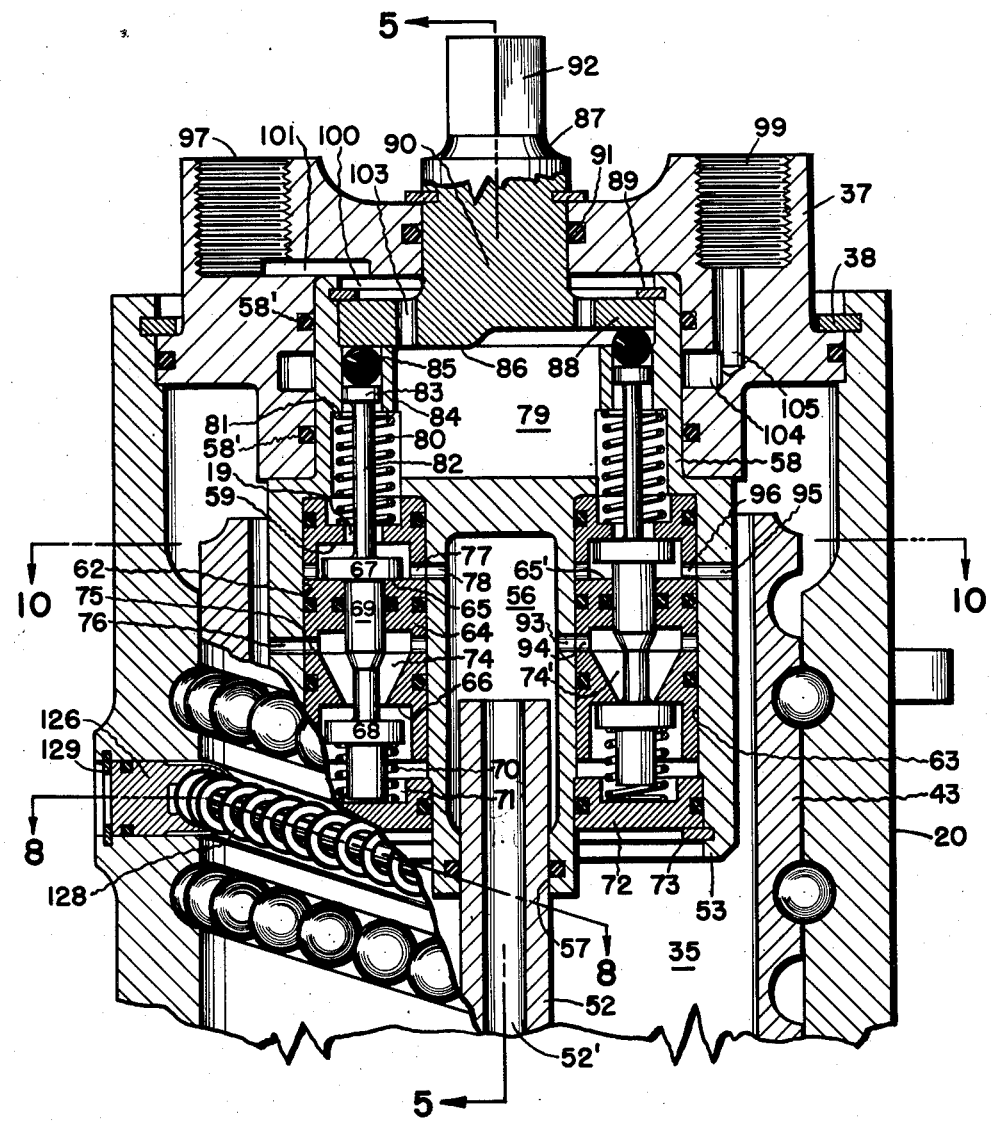
Figure 4 is an enlarged longitudinal sectional view taken through line 4—4 in Figure 3 of the upper end portion of the unit.
Figure 7:
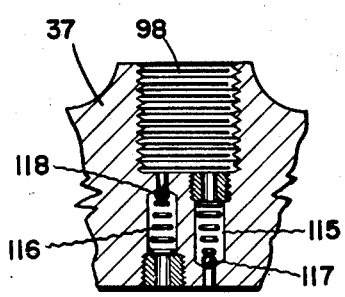
Figure 7 is an enlarged longitudinal sectional view taken on line 7—7 in Figure 3.

In addition to the hydraulic damping device above described, there is also to be considered the mechanical or spring check shown in Figures 4 and 8, a construction which is primarily intended as a self-centering device, but also functions to assist the hydraulic damper. As the piston 43 is rotated relative to cylinder 20 in response to the shimmy motion of the wheel 24, it will compress one or the other of springs 128 between one of the heads 121 on the rod 120 and the plug 126 fixed to the cylinder, to check the relative motion between piston 43 and cylinder 20. It will thus be understood that the unit is equipped with two different shimmy checking devices, one for the reciprocatory motion of the piston and the other for its rotary motion.

Connection 98 is preferably connected to the hydraulic system of the airplane, but because the fluid supplied thereto should be of a lesser pressure than that supplied into the connections 97 and 99, it is necessary to incorporate in its conduit a pressure reducer of any well-known type. Since, as in any hydraulically actuated device, it is important to maintain the device entirely filled with hydraulic fluid, the connection 98 is primarily intended to afford a replenishing means for the hydraulic fluid which might have escaped from the device. To that end, the port 116 which leads from connection 98 to the chamber 35 and is normally closed by the valve 118, will, upon higher pressure in the connection than in the chamber, be opened by the valve 118 to automatically replace hydraulic fluid which might accidentally have escaped from the unit. If preferred, rather than connecting the screw threaded fore or connection 98 to the hydraulic system of the airplane, there may be screwed into it the outlet end of a small liquid container wherein liquid is slightly pressurized by any suitable means such as a spring pressed bulkhead or the like.

Also with reference to the shimmy damper, that is when the two connections 97 and 99 are closed, in order to prevent excessive pressure of the hydraulic fluid within the unit, by expansion of the fluid resulting from pronounced temperature increases, there is provided a bleeder port 115 leading from connection 98 to chamber 35 and normally closed by a check valve 117. As the pressure within the unit reaches a predetermined maximum, it will cause check valve 117 to open port 115 to release this excessive pressure into the connection 98 and therefrom into the low pressure conduit of the hydraulic system of the airplane, or into the liquid container above referred to.

When it is desired to operate the unit as a steering device, it is first necessary for the pilot to open the valve, not shown, controlling the conduits 97 and 99 for admitting pressure fluid to the connection 99 and returning pressure fluid through the conduit 97. Irrespective of the position of the steering member 87, pressure fluid is admitted from the connection 99 to the annular groove 104 through ports 105, and through ports 106, to the annular groove or inlet passageway 71 of the ring plate 72, thereby acting on the lower ends of the sleeves 64 to shift and maintain them in their upper position shown in Figure 4 against the tension of the springs 80. With the steering member 87 positioned as shown in Figure 4, that is with the left hand valve 69 depressed by the lower level land 93 of the flange 88, pressure fluid from the annular groove 71 is free to flow past the valve seat 66 into pocket 74 and therefrom into the cylinder chamber 35 through sleeve port 75 and chamber housing port 76, thereby imparting downward axial movement to the piston 43 which, by virtue of the balls 45 within the helical channel 42—44, is translated into its rotary motion in a clockwise direction in Figure 4. From piston 43, rotation or steering motion in the same direction is transmitted to the wheel 24 through the linkage 49, 50 and 51. As the piston 43 is moved downwardly, it gradually expels the liquid from the cylinder chamber 36 through the piston stem port 52′, valve housing cylinder recess 56 and port 78, sleeve port 77, over valve seat 59, and through port 19 into chamber 79 from where it is free to return to the hydraulic system of the airplane through ports 103, annular groove 100, passageway 101 and outlet port 97.

When it is desired to steer the wheel 24 in the other direction, the steering member 87 is rotated so as to engage the ball 85 of the left hand valve 69 in Figure 4 with the high level land 93′ of the flange 88, thereby enabling spring 70 to close the valve, that is to cause an engagement of the valve heads 67 and 68 with the valve seats 59 and 66, respectively. In this position of the steering member 87, the right hand valve 69 is depressed by the lower level land 93 of the flange 88, thereby enabling pressure fluid admitted into annular groove 71 to flow into pocket 74′ of the right hand sleeve 64 and therefrom into the cylinder chamber 36 through sleeve port 94, valve housing port 93, chamber 56 and piston port 52′. Piston 43 will respond to the action of the pressure fluid within chamber 36 by moving axially upward and also being rotated in a counter-clockwise direction in Figure 4, which rotation in that same direction is transmitted to the wheel 24. As the piston is moving upwardly, it will gradually expel the pressure fluid from the chamber 35 through valve housing port 95, port 96 of the left hand sleeve 64, over valve seat 59, port 19 and into chamber 79 from which it is free to flow to outlet port 97, again through ports 103, annular groove 100 and passageway 101.

Since the valve housing 53 is rotatable with the piston 43 by virtue of the pins 55 sliding within grooves 54, it will be understood that the landing wheel 24 may be turned or steered to any desired position by simply placing the steering member 87 in the desired position, which might be visually indicated on the pilot's control panel. For instance, if it is desired to turn the landing wheel 30 degrees from neutral position, the steering member 87 may be rotated 30 degrees, thereby imparting rotation to piston 43 in the manner above described and to the valve housing 53 until one of the valves 69 having reached the end of its 30 degree travel on the low land 93 is again shut off upon reaching the high land 93′. As both valves 69 are closed by engagement with the high land 93′, the piston 43 remains stationary and the wheel 24 is held in the steered position corresponding to the position of the steering member 87. This follow-up feature of the valve housing 53 through which the steering wheel may assume a predetermined position, which is controlled by the preset position of the steering member 87 actually amounts to an automatic power steering device.

The modified construction shown in Figure 12 is intended as a manual steering device wherein the follow-up feature of the valve housing above referred to is nullified by continuous manual rotation of the steering member 137. In the neutral position of the steering member 187, that is when both valves 69 are closed by engaging the high land 193', the pin 201 is equally spaced from the side walls of the slot 200. When it is desired to steer the wheel 24 in one or the other direction, the steering valve member 187 is rotated until the pin 201 engages one or the other sides of the slot 200, which limited rotation is sufficient for the low land 193 to move over and open either of the valves 69 depending upon the direction of the rotation of the member 187. As one of the valves is open, it will cause piston 43 and valve housing 53 to rotate in one direction for imparting steering motion to wheel 24. As the wheel rotates, the steering member 187 is manually rotated to maintain pin 201 against its engaging side of the slot 200, thereby imparting continuous rotation to the wheel 24 until the steering member is again set in a neutral or reversed position or until the wheel reaches the end of its steering travel, which is preferably indicated or limited by a stop on the control panel, preventing future rotation of the steering member 187 in that direction. In practice, the pilot can actually steer the wheel 24 by simple rotation of the steering member 187 in either direction without detecting the small play of the steering member resulting from travel of the pin 201 from one to the other side of the slot 200.

The self-centering device shown in Figure 8 is intended to maintain the landing wheel 24 in the direction of flight during landing and take off and also while retracting the landing wheel into and lowering it from its accommodating well. In such instance, the valve controlling the conduits leading to the connections 97 and 99 is shut off, and the unit not pressurized, thereby enabling the springs 128 to apply equal pressure on opposite sides of the plug 126 to maintain the piston 43 in a predetermined position relative to the cylinder 20, which corresponds to the direction of flight position for the landing wheel 24.

While the preferred form of the invention has been shown and described, it will be understood that variation in detail and form may be made without departure from the spirit and scope of the invention as herein claimed.

I claim:

1. In a device of the character described, a fluid tight housing, a fluid actuated cup-shaped piston axially movable in said housing, interengaging means between said piston and housing translating axial movement of said piston into its rotary motion, pressure fluid inlet and outlet means for said housing, two sets of fluid conveying passages from said inlet and outlet means to and from said piston, a valve block within said piston, rotation transmitting means between said piston and block enabling relative axial movement therebetween, a pair of valves within said block one for each set of said passages, spring means normally closing said valves relative to said passages, said valves being individually operable relative to their respective set of passages for effecting axial and rotary motion of said piston in one or the other direction, and valve contacting means movable into engagement with either of said valves to open same and positionable to extend from said opened valve ahead thereof relative to the direction of its rotation, whereby the opening time of said valve is limited to its travelling time over said valve contacting means.

2. In a device of the character described, a fluid tight housing, a pressure fluid actuated member within said housing, means including passages admitting and exhausting pressure fluid into and from said housing, valve means controlling said passages, spring means normally closing said valve means relative to said passages, means engageable with said valve means for opening same relative to said passages, and sleeve means surrounding said valve means for closing said passages irrespective of the position of said valve means relative thereto.

3. In a device of the character described, a housing, a pressure fluid actuated member within said housing, inlet means supplying pressure fluid to said housing, outlet means exhausting spent pressure fluid from said housing, both said inlet and outlet means adapted to be shut off to provide a fluid tight housing with said member normally stationary therein, pressure fluid inlet and outlet passages leading from said inlet and outlet means into said housing on opposite sides of said member, spring biased valve means normally closing said passages, means engageable with said valve means for opening same relative to said passages, and sleeve means surrounding said valve means automatically closing said passages irrespective of said valve means upon the shut off of said inlet and outlet means.

4. In a device according to claim 3, which also includes means enabling displacement of fluid stored within the fluid tight housing after said shut off to take place restrictedly upon movement of said member by forces exerted thereon other than pressure fluid.

5. In a device of the character described, a housing, a pressure fluid actuated member within said housing, inlet means supplying pressure fluid to said housing, outlet means exhausting spent pressure fluid from said housing, both said inlet and outlet means adapted to be shut off to provide a fluid tight housing with said member normally stationary therein, pressure fluid inlet and outlet passages leading from said inlet and outlet means into said housing, spring biased sleeve means normally closing said passages responsive to pressure fluid supplied into said housing through said inlet means for shifting into open position relative to said passages, spring biased valve means within said sleeve means cooperating therewith for normally closing said passages during the open position of said sleeve means relative thereto, and means for shifting said valve means into open position relative to said passages during said open position of said sleeve means.

6. In a device of the character described, a housing formed with a piston chamber, a pressure fluid actuated piston within said chamber, inlet means supplying pressure fluid into said chamber, outlet means exhausting spent pressure fluid from said housing, both said inlet and outlet means adapted to be shut off to provide a fluid tight chamber with said piston normally stationary therein, pressure fluid inlet and outlet passages from said inlet and outlet means into said chamber on opposite sides of said piston, spring biased sleeve means normally closing said passages, a pressure area for said sleeve means responsive to pressure fluid supplied into said chamber for shifting said sleeve means in open position relative to said passages, a by-pass in said chamber from one side of said piston to the other, a spring biased piston valve normally closing said by-pass, and pressure areas on said piston valve opposed to the spring bias acting thereon and responsive to pressure variations within said chamber on either side of said piston for restrictedly opening said by-pass.

7. In a device of the character described, a housing formed with a piston chamber, a fluid actuated cup-shaped piston axially movable in said housing, interengaging means between said housing and piston translating axial movement of the piston into its rotary motion, pressure fluid inlet and outlet means for said chamber, a valve block axially fixed to and journaled within said housing, said block extending into said piston and connected thereto for rotation therewith, a stem extending from said piston slidably into said block, a first passageway through said stem opening on one side of said piston, a second passageway annularly between said piston and valve block opening on the other side of said piston, a first set of passages within said block including a pressure inlet passage connecting said inlet means with said second passageway and said outlet means with said first passageway, a second set of passages within said block including a pressure fluid inlet passage connecting said inlet means with said first passageway and said outlet means with said second passageway, a pair of valves within said block one for each said sets of passages, spring means normally closing said valves relative to said passages, said valves being individually operable relative to their respective set of passages for effecting axial and rotary motion of said piston in one or the other direction, and valve contacting means movable into engagement with either of said valves to open same and adapted to extend from said opened valve ahead thereof relative to the direction of its rotation, whereby the opening of said valve is limited to its traveling time over said valve contacting means.

8. In a device of the character described, a housing formed with a piston chamber, a fluid actuated cup-shaped piston axially movable in said chamber, interengaging means between said housing and piston translating axial movement of the piston into its rotary motion, pressure inlet and outlet means for said chamber, a valve block within said piston connected thereto for rotation therewith and axially fixed to said housing, pressure fluid inlet and outlet passages through said block and piston connecting said inlet and outlet means with said chamber on opposite sides of said piston for effecting its axial and rotary motion in either direction, valve means within said block rotatable therewith normally closing said passages, and a valve means contacting element movable into engagement with said valve means to open same and adapted to extend from said open valve means ahead thereof relative to the direction of its rotation, whereby the opening of said valve means is limited to its traveling time over said valve contacting element.

9. In a device of the character described, a housing, a pressure fluid actuated piston axially movable within said housing, inlet and outlet passages for admitting and exhausting pressure fluid into and from said housing for actuating said piston, a valve block within said housing, a pair of valve units within said block, each unit comprising first and second cooperating valve members, the first valve member of each unit subjected to pressure fluid admitted into said housing and moved thereby into open position relative to said passages, the second valve member of each unit being adapted to open relative to said passages to effect axial movement of said piston in one or the other direction, and an operator movable for selectively opening either of said second valve members.

10. In a device of the character described, a fluid tight housing, inlet and outlet means for admitting and exhausting pressure fluid into and from said housing, a pressure fluid actuated piston axially movable within said housing, fluid conveying passages from said inlet and outlet means to opposite ends of said piston, a pair of valve units normally closing said passages, each unit comprising engaging and cooperating first and second valve members, the valve members of one unit adapted to open some of said passages for effecting axial movement of said piston in one direction, the valve members of the other of said unit adapted to open other of said passages for effecting axial movement of said piston in the other direction, means for concurrently opening the first valve member of both units, and an operator movable for selectively opening either of said second valve members.

11. In a device of the character described, a fluid tight housing, a fluid pressure actuated element rotatable within said housing, means including passages admitting and exhausting pressure into and from said housing, a valve member controlling said passages, spring means normally closing said valve member relative to said passages, means including a valve contacting land movable into engagement with said valve member for opening same relative to said passages, means responsive to the rotating of said element moving said valve member over said land and beyond the boundary thereof to be thereafter closed by said spring means, and sleeve means surrounding said valve member for closing said passages irrespective of the position of said valve member relative thereto.

12. In a device of the character described, a fluid tight housing, a pressure fluid actuated member within said housing, passages admitting and exhausting pressure fluid into and from said housing, an inlet passageway having pressure fluid supplied thereto, a spring biased valve member normally closing said passages, means engageable with said valve member for opening same relative to said passages, and a spring biased valve element normally closing said passages irrespective of the position of said valve member relative thereto, said valve element being exposed to the action of the pressure fluid within said inlet passageway and shifted thereby into open position relative to said passages.

References Cited in the file of this patent

UNITED STATES PATENTS

| | | |
|---|---|---|
| 416,147 | Edgerton | Nov. 26, 1889 |
| 570,246 | Boluss | Oct. 27, 1896 |
| 1,083,810 | Engberg | Jan. 6, 1914 |
| 1,817,903 | Aikman | Aug. 11, 1931 |
| 1,921,344 | Chilton | Aug. 8, 1933 |
| 1,982,853 | Brainard | Dec. 4, 1934 |
| 2,159,142 | Fischer | May 23, 1939 |
| 2,192,175 | Ballard | Mar. 5, 1940 |
| 2,261,444 | Neubert | Nov. 4, 1941 |
| 2,324,750 | Wiedmann | July 20, 1943 |
| 2,387,896 | Giger | Oct. 30, 1945 |
| 2,543,876 | Smith | Mar. 6, 1951 |
| 2,589,341 | Chisholm et al. | Mar. 18, 1952 |
| 2,618,121 | Tucker | Nov. 18, 1952 |
| 2,634,708 | Davis | Apr. 14, 1953 |
| 2,654,347 | Clark | Oct. 6, 1953 |

FOREIGN PATENTS

| | | |
|---|---|---|
| 987,883 | France | Apr. 18, 1951 |